United States Patent [19]
Stevens

[11] 3,835,808
[45] Sept. 17, 1974

[54] LOW PRESSURE WARNING SYSTEM FOR A TIRE

[75] Inventor: Peter Stevens, Mississauga, Ontario, Canada

[73] Assignee: The Raymond Lee Organization, Inc., New York, N.Y. ; a part interest

[22] Filed: Dec. 18, 1973

[21] Appl. No.: 426,100

[52] U.S. Cl............................... 116/34 R, 73/146.8
[51] Int. Cl............................................. B60c 23/02
[58] Field of Search....... 116/34 R; 73/146.2, 146.8, 73/146.3; 137/227

[56] References Cited
UNITED STATES PATENTS

| | | | |
|---|---|---|---|
| 1,038,433 | 9/1912 | Polo.................................. | 116/34 R |
| 2,893,343 | 7/1959 | Judd................................. | 116/34 R |
| 3,111,930 | 11/1963 | Zipper.............................. | 116/34 R |

*Primary Examiner*—Louis J. Capozi
*Attorney, Agent, or Firm*—Daniel Jay Tick

[57] ABSTRACT

A low pressure warning system for a wheel mounted tire comprises a housing on the tire having a first opening at one end thereof into the tire. A closing member extends across the housing at the opposite end thereof. A second opening is provided in the closing member. A plurality of openings are formed through the housing adjacent the closing member admitting air into the housing. The housing has a free end extending beyond the closing member. An air-operated whistle is mounted in the housing in the free end thereof. A diaphragm is mounted in the housing and extends thereacross. A pin is supported by the diaphragm and movable therewith. The pin extends substantially coaxially through the housing to the area of the second opening thereof. A spring retainer is mounted in the housing and extends thereacross. A spring having a predetermined force is coaxially positioned around the pin and extends between the spring retainer and the diaphragm. When the pressure of air in the tire is at least the proper pressure, the force of air on the diaphragm equals the force of the spring on the diaphragm and the diaphragm retains the end of the pin in the second hole thereby preventing air from flowing from the opening in the housing through the second opening and through the whistle. When the pressure of air in the tire is less than the proper pressure, the force of the spring is greater than the force of air on the diaphragm and the diaphragm moves the pin out of the second opening thereby permitting air due to the rotary motion of the wheel mounted tire to flow from the openings in the housing through the second opening and through the whistle to sound an audible alarm.

1 Claim, 2 Drawing Figures

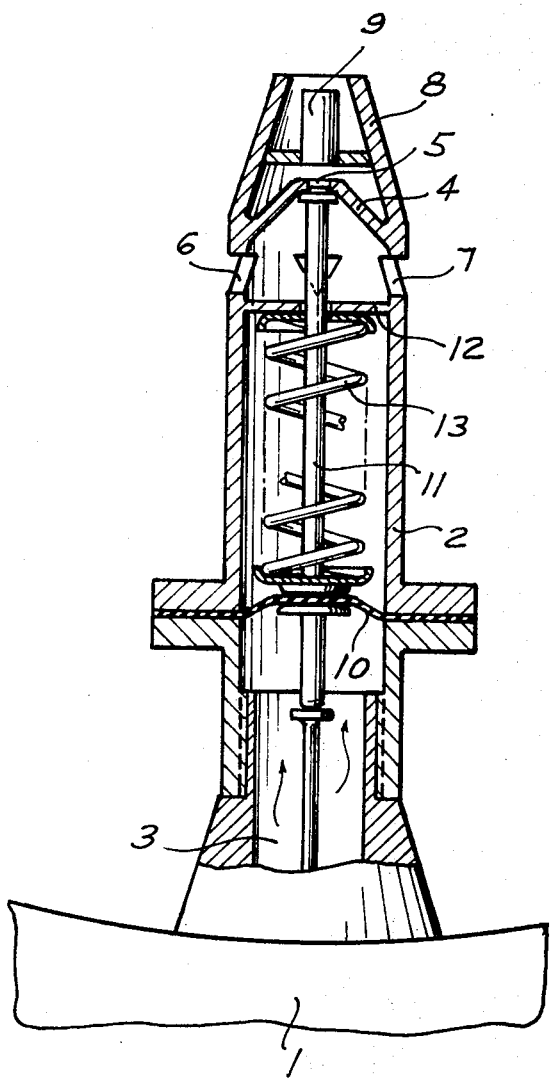
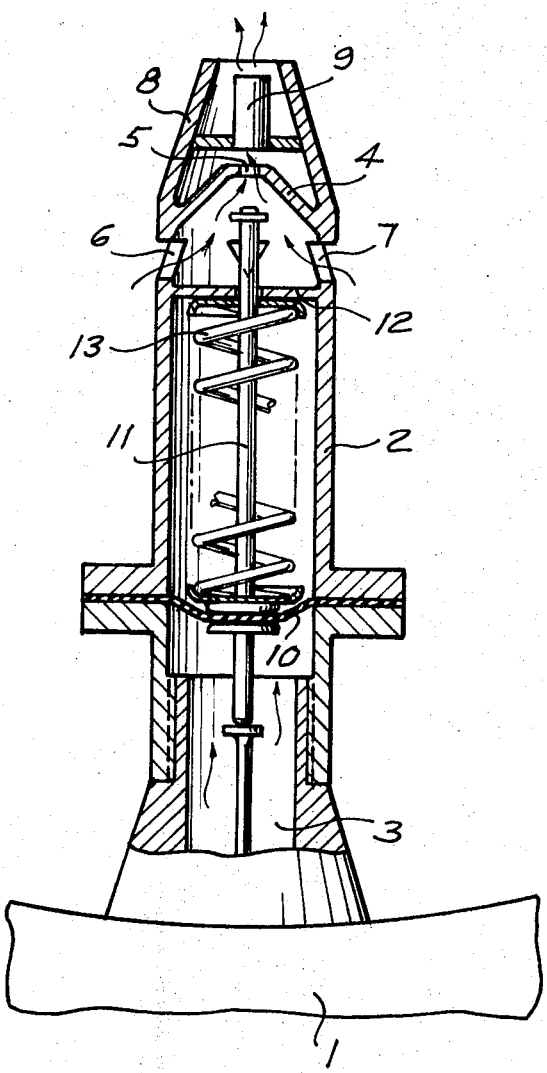

LOW PRESSURE WARNING SYSTEM FOR A TIRE

DESCRIPTION OF THE INVENTION

The present invention relates to a low pressure warning system for a tire.

Objects of the invention are to provide a low pressure warning system for a tire, which system is of simple structure and functions with efficiency, effectiveness and reliability to warn the operator of a vehicle when the pressure in a tire decreases below a proper desired air pressure.

In order that the invention may be readily carried into effect, it will now be described with reference to the accompanying drawing, wherein:

FIG. 1 is a view, partly in section, of an embodiment of the low pressure warning system of the invention, in its condition when the air pressure in a tire is at its proper desired level; and FIG. 2 is a view, partly in section, of the embodiment of FIG. 1, in its condition when the air pressure in a tire is less than its proper desired level.

In the FIGS., the same components are identified by the same reference numerals.

The low pressure warning system of the invention is for a tire 1 having a proper desired air pressure.

The warning system of the invention comprises a housing 2 on the tire 1 having a first opening 3 at one end thereof into the tire. A closing member 4 extends across the housing at the opposite end thereof. A second opening 5 is provided in the closing member 4. A plurality of openings 6, 7, and so on, are formed through the housing 2 adjacent the closing member 4 for admitting air into the housing. The housing 2 has a free end 8 extending beyond the closing member 4.

An air-operated whistle 9 is mounted in the housing 2 and extends thereacross. A pin 11 is supported by the diaphragm 10 and is movable therewith. The pin 11 extends substantially coaxially through the housing 2 to the area of the second opening 5 thereof.

A spring retainer 12 is mounted in the housing 2 and extends thereacross.

A spring 13 having a predetermined force is coaxially positioned around the pin 11 and extends between the spring retainer 12 and the diaphragm 10.

When the pressure of air in the tire 1 is at least the proper pressure, the force of air on the diaphragm 10 equals the force of the spring 13 on the diaphragm and the diaphragm retains the end of the pin 11 in the second hole 5 thereby preventing air from flowing from the openings 6, 7, and so on, in the housing 1 through the second opening and through the whistle 9.

When the presure of air in the tire 1 is less than the proper pressure, the force of the spring 13 is greater than the force of air on the diaphragm 10 and the diaphragm moves the pin 11 out of the second opening 5 thereby permitting air to flow from the openings 6, 7, and so on, in the housing 1 through the second opening and through the whistle 9 to sound an audible alarm.

While the invention has been described by means of a specific example and in a specific embodiment, I do not wish to be limited thereto, for obvious modifications will occur to those skilled in the art without departing from the spirit and scope of the invention.

I claim:

1. A low pressure warning system for a wheel mounted tire having a proper desired air pressure, said warning system comprising a housing on the tire having a first opening at one end thereof into the tire, a closing member extending across the housing at the opposite end thereof, a second opening in the closing member, a plurality of openings formed through the housing adjacent the closing member admitting air into the housing, the housing having a free end extending beyond the closing member;

an air-operated whistle mounted in the housing in the free end thereof;

a diaphragm mounted in the housing and extending thereacross;

a pin supported by the diaphragm and movable therewith, said pin extending substantially coaxially through the housing to the area of the second opening thereof;

a spring retainer mounted in the housing and extending thereacross; and a spring having a predetermined force coaxially positioned around the pin and extending between the spring retainer and the diaphragm whereby when the pressure of air in the tire is at least the proper pressure, the force of air on the diaphragm equals the force of the spring on the diaphragm and the diaphragm retains the end of the pin in the second hole thereby preventing air from flowing from the openings in the housing through the second opening and through the whistle, and when the pressure of air in the tire is less than the proper pressure, the force of the spring is greater than the force of air on the diaphragm and the diaphragm moves the pin out of the second opening thereby permitting air to flow from the openings in the housing through the second opening and through the whistle to sound an audible alarm due to the rotary motion of the wheel mounted tire.

* * * * *